J. B. Bailey,
Curtain Fixture,
N°. 47,891. Patented May 23, 1865.
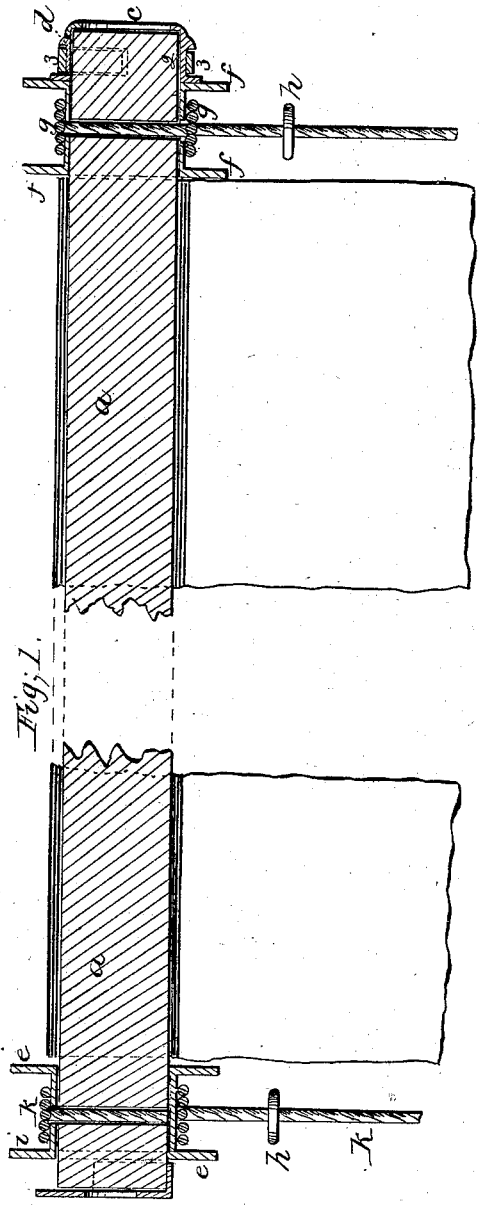
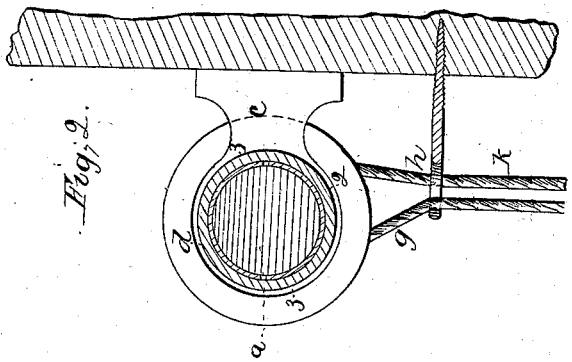
Witnesses:
Thos. Geo. Harold
Chas. H. Smith
Inventor:
J. B. Bailey

UNITED STATES PATENT OFFICE.

JACOB B. BAILEY, OF NEW YORK, N. Y., ASSIGNOR TO SAMUEL E. BAILEY, OF SPRINGFIELD, MASSACHUSETTS.

IMPROVED CURTAIN-FIXTURES.

Specification forming part of Letters Patent No. 47,891, dated May 23, 1865.

*To all whom it may concern:*

Be it known that I, JACOB B. BAILEY, of the city and State of New York, have invented, made, and applied to use a certain, new and useful Improvement in Curtain-Fixtures; and I do hereby declare the following to be a full, clear, and exact description of the said invention, reference being had to the annexed drawings, making part of this specification, wherein—

Figure 1 is a section representing the brackets and ends of the curtain-roller. Fig. 2 is a cross-section through the roller and bracket at the line *x x*.

Similar marks of reference denote the same parts.

The nature of my said invention consists in a ring-shaped clamping-bracket receiving the end of the curtain-roller and pressing thereon with sufficient friction to prevent the weight of the curtain or shade turning the roller. The said roller is also provided with ring-flanges at the ends of the curtain, slipped upon the roller, and the cord by which the curtain is wound up is attached directly to the roller. By this mode of construction it only becomes necessary to saw off a roller to the proper length, secure thereto the end of the curtain-slip or the said ring-flanges, and fasten the cord, and it is ready for introduction into the brackets and immediate use.

In the drawings, *a* is an ordinary round curtain-roller. *b* is a bracket with a half-ring flange, 1, so as to allow the end of the roller to be dropped in or lifted out. *c* is the bracket at the other end. Both these brackets may be attached in any usual manner.

I have, however, shown a slotted-flange receiving a screw, as usual, to allow for slight adjustment of the distance between one bracket and the other.

The bracket *c* is formed with a ring-socket, 2, in the upper side of which is an opening for receiving the friction clamping-piece *d*, that is guided and held in place by a lug on its side, taking a groove in the socket, so that it may press upon the end of the roller *a* when inserted into the socket 2, said clamp *d* being acted upon by the contractile rubber spring 3, that is formed of a band stretched over the socket 2, and received into a groove formed around the periphery of said socket.

Any other character of spring, however, might be applied to the clamp *d* to press it upon the roller and produce the friction necessary to keep it from turning by the weight of the curtain.

*e* is a flange formed as a flat ring to guide the curtain at the edge next the bracket *b*; and *f* is a spool formed as a cylinder, with two flat ring-flanges, one of which guides the curtain at the edge next the bracket *c*, and between which flanges the cord *g* is wound. This spool is slid upon the roller *a*, and the cord is passed through a hole in it and the roller *a*, to prevent said spool turning upon the roller in winding up or unwinding the curtain.

It will be evident that two ring-flanges would guide the cord if wound directly upon the roller *a*, instead of a spool formed by those flanges and a cylindrical connection between them. The cord *g* passes off through a screw-eye, *h*, inserted in the window-casing separate from the other parts of the curtain-fixture, and only becoming a guide for the cord.

Adjacent to the flange *e* is a second flange, a or the two might be connected and form *i*, spool, like the spool *f*. Between these flanges a second cord, *k*, is attached at one end to the spool or roller, and is wound in the opposite direction to the cord *g*, so that as the cord *g* unwinds in pulling the shade up, the cord *k* will wind upon the roller and is employed for rotating the said roller so as to draw the curtain down. This arrangement of two cords and spools renders it unnecessary to reach the curtain to pull it down, and is a great convenience, particularly with large or long curtains, and renders it unnecessary to attach a cord, as has sometimes been done, to the bottom slat of the blind to pull it down.

What I claim, and desire to secure by Letters Patent, is—

1. The ring-socket *c*, receiving the end of the curtain-roller in combination with the clamping-piece *d*, introduced and actuated as and for the purposes specified.

2. A flanged spool with an opening through its center for the curtain-roller, the said spool being retained in place by attaching the cord, substantially as specified.

3. A contractile india-rubber band applied, substantially as specified, to create friction for preventing the weight of the curtain turning the roller.

4. A curtain-roller in which friction is applied to sustain the curtain in any position, in combination with two cord-spools and cords, wound in opposite directions, for the purposes and as specified.

In witness whereof I have hereunto set my signature this 31st day of January, 1865.

J. B. BAILEY.

Witnesses:
    THOS. GEO. HAROLD,
    CHAS. H. SMITH.